United States Patent Office 3,297,746
Patented Jan. 10, 1967

3,297,746
POLYALKOXYLATED AND POLYARYLOXYL-
ATED DERIVATIVES OF DI(HYDROXYARO-
MATIC)ALKANOIC ACIDS
Norman A. Jacobson and Edward A. Wilder, Racine,
Wis., assignors to S. C. Johnson & Son, Inc., Racine,
Wis.
No Drawing. Filed Nov. 1, 1963, Ser. No. 320,936
5 Claims. (Cl. 260—473)

This invention relates to novel compounds and compositions of matter. More particularly, it is concerned with polyalkoxylated and polyaryloxylated derivatives of di(hydroxyaromatic)alkylidene carboxylic acids. Certain of these novel compounds are useful as surface active agents, and/or in compositions for regulating the growth rate of plants. The novel compounds of this invention may be represented by the general formula:

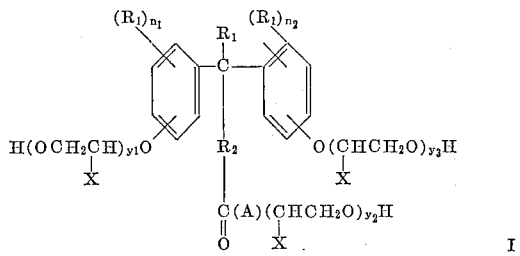

wherein $R_1$ is a hydrogen atom or a lower alkyl radical such as methyl, ethyl, propyl, tertiary butyl and the like containing up to five carbon atoms; $n_1$ and $n_2$ are each whole numbers from 1 to 2; X is a hydrogen atom or a lower alkyl radical such as methyl or ethyl and containing up to three carbon atoms, aryl radicals such as phenyl and alkaryl radicals containing up to nine carbon atoms such as tolyl; $y_1$, $y_2$ and $y_3$ are each integers with a value of at least one, the sum of the integers being from about 3 to about 55, and preferably from about 9 to about 55; $R_2$ is an alkylene radical containing at least two carbon atoms and A represents a radical selected from the group consisting of —O— and

wherein $R_3$ is a hydrogen atom or an alkyl radical containing up to 18 carbon atoms such as methyl, ethyl, octyl and octadecyl radicals. The above formula shall be referred to hereinafter as General Formula I.

The starting compounds used in the preparation of the valuable compounds of this invention can be prepared in accordance with the procedure described in U.S. patent to Bader, 2,933,520, issued April 19, 1960. In accordance therewith, di(hydroxyaromatic)alkylidene carboxylic acids are prepared by reacting aromatic-hydroxy compounds, containing one or more available hydrogen atoms in the aromatic ring, with a carboxylic acid containing a carbonyl group such as a keto group, at least two carbon atoms removed from the carboxyl group in the hydrocarbon chain. A similar reaction can be carried out where the carboxylic acid contains an aldehyde group at least two carbon atoms removed from the carboxyl group in the hydrocarbon chain. Preferably, the reaction is conducted in the presence of a catalyst, for example, a relatively strong mineral acid, such as hydrochloric, hydrobromic, phosphoric or sulfuric acid. Aromatic hydroxy compounds which are useful in the preparation of starting materials for the preferred compounds of this invention include certain phenolic compounds such as phenol and ortho, meta and para-cresol. Other phenolic compounds such as ortho-isopropyl phenol, xylenol, ortho-tertiary-butyl phenol and ortho-propyl phenol can also be used. Suitable phenolic compouds can be represented by the formula:

wherein $R_1$ and $n_1$ are as defined in General Formula I above. The above formula will be referred to hereinafter as Formula II.

Suitable acids containing a carbonyl group at least two carbon atoms from the carboxyl group and which will react with the aromatic hydroxy compounds to produce compounds within the scope of the invention include such keto acids as levulinic, delta-ketocaproic and geronic acids and aldehyde acids such as formal acetic acid; propionic acid, α-formyl; butyric acid, γ-formyl; pentanoic acid, δ-formyl; and nonic acid, θ-formyl; and other acids having the general formula:

wherein $R_1$ and $R_2$ are as defined above. The above formula will be referred to hereinafter as General Formula III.

Reaction between the above-defined carbonyl-carboxylic acids and aromatic hydroxy compounds may be effected with or without a solvent in the presence of from about 5 to about 50% by weight of acid catalyst, based on the reactants present, at a temperature from about 90° C. to about 100° C. for a period of time of from about one hour to several days.

Examples of reactants employed in the preparation of preferred compounds within the scope of this invention are levulinic acid and/phenol and/or ortho-cresol. These reactants are preferred since they are readily available at reasonable cost, and produce the corresponding reaction products in relatively high yields. The product produced by reaction of levulinic acid with phenol is 4,4-bis(4-hydroxyphenyl)pentanoic acid. The product of the reaction of levulinic acid with ortho-cresol is 4,4-bis(4-hydroxy-5-methylphenyl)pentanoic acid. This invention will be further described with particular reference to these compounds, but it should be kept in mind that the invention embodies any and all compounds within the scope of General Formula I.

In accordance wtih the presently preferred method, the compounds of this invention are prepared by reacting the selected di(hydroxyaromatic)alkylidene carboxylic acid and an organo oxide such as an alkylene or aralkylene oxide in the presence of catalytic amounts of a base such as a tertiary amine, i.e. triethylamine and other bases such as the hydroxide, carbonate, bicarbonate, lower alkoxide or an oxide of an alkali or akaline earth metal. Sodium hydroxide, sodium carbonate and sodium methoxide are especially preferred, and these are used in amounts of from about 0.5% to about 2% by weight, based on the amount of dihydroxy aromatic compound employed.

Organo oxides suitable for this reaction can be represented by the formula:

wherein X is as defined above in Formula I. The above formula shall be referred to hereinafter as Formula IV.

The reaction is preferably conducted in a solvent free system, however, if necessary it can be carried out in an inert organic reaction solvent. If a solvent is utilized, ethers such as dioxane, tetrahydrofuran or butyl-ether are preferred.

In a typical reaction for preparing the compounds of this invention, the organo oxide reacts substantially simultaneously with the parent functional groups at the three different reaction sites, i.e., the two hydroxyl groups and the carboxyl group. Additional organo oxide then reacts with the resulting reaction product at the three addition sites, so that the molecule is enlarged by chain lengthening-type reactions occurring at the various reaction sites between the organo-oxylate and the organo oxide. Hence, the longer the reaction time at a particular temperature, the higher will be the molecular weight of the resulting product to the extent of the organo oxide present. It is understood, of course, that the rate of organo oxide additions at the various reaction sites is not necessarily equal and an organo-oxylate having varying chain length polyoxylates can be produced.

The temperature at which the reaction is carried out is not critical, but generally it is preferred to operate in the range from about 100° C., to about 200° C., since this temperature range is consistent with reasonably high reaction rates without the expenditure of excess thermal energy. With low-boiling solvents, the reaction can be effected under pressure to permit increased reaction temperatures.

The amount of organo oxide which will be employed (expressed herein as moles) depends upon the desired molecular weight of the finished product. To obtain a product having a desired molecular weight, it is preferred to introduce a predetermined amount of the organo oxide into the reaction and continue the reaction to completion thereby exhausting the organo oxide.

One method for carrying out the reaction is to slowly bubble an organo oxide such as ethylene or propylene oxide through a solution or molten mass of the catalyst-hydroxy acid reaction mixture maintained at the selected temperature and to follow the rate of reaction by withdrawing samples of the mixture from time to time. The molecular weight of the reaction product in each sample can be determined by any convenient method to ascertain the extent of reaction. In a preferred method, the reaction is carried out on a balance with the number of moles of organo oxide added determined by the increased weight of the reaction mass.

The following nonlimiting examples illustrate the preparation of compounds within the scope of the invention:

EXAMPLE 1.—REACTION OF 4,4-BIS(4-HYDROXYPHENYL)PENTANOIC ACID WITH ETHYLENE OXIDE

A one-liter, 3-necked flask, containing 143 gms. (0.5 mole) of 4,4-bis(4-hydroxyphenyl)pentanoic acid and 1.4 gms. of sodium hydroxide, is fitted with an air motor and a gas inlet tube with a three-way stopcock and an exhaust valve. The reaction mixture is heated to a temperature ranging from about 150°–170° C. to melt the acid while purging the flask with nitrogen. Stirring is commenced as soon as the acid is liquid, the nitrogen flow is stopped and the ethylene oxide flow is commenced. The ethylene oxide is maintained at approximately 3 mm. of mercury pressure (above atmospheric pressure) while the temperature of the reaction mixture is held at between about 160° and about 170° C. The ethylene oxide flow is adjusted to approximately equal the reaction rate. The initial reaction is relatively slow until about one mole of ethylene oxide is added. Thereupon, the reaction rate increases. The number of moles of ethylene oxide added can be calculated by the increase in the total weight of the reaction mixture. When the desired weight indicative of the number of moles of ethylene oxide added to the mixture has been attained, the reaction is terminated by simply stopping the flow of ethylene oxide and purging the flask with nitrogen to remove the last traces of ethylene oxide. Ethoxylated 4,4-bis(4-hydroxyphenyl)pentanoic acid derivatives wherein the mole ratio of ethylene oxide to acid ranged from about 1 to 1, to about 55 to 1 were prepared according to the above process.

It is understood that various organo oxides of Formula IV can be substituted for ethylene oxide in the above reaction to produce the corresponding organo-oxylated product. For example, butylene oxide, propylene oxide, styrene oxide, 3-propylstyrene oxide, 4-ethylstyrene oxide and mixtures thereof can be used.

It is further understood that other di(hydroxyaromatic)-alkylidene carboxylic acids of Formula III can be combined with an organo oxide according to the teaching of the present invention. For example, 4,4-bis(4-hydroxy-5-ethylphenyl)hexanoic acid, 5,5-bis(4-hydroxy-5-diisopropylphenyl)heptanoic acid, 4,4-bis(4-hydroxy-5-methylphenyl 4'-hydroxy-5'-ethylphenyl)butanoic acid, 6,6-bis(4-hydroxy-5-pentylphenyl)caproic acid, 3,3-bis(4-hydroxy-5-ethylphenyl)butyric acid and mixtures thereof can be substituted for the 4,4-bis(4-hydroxyphenyl)pentanoic acid employed above.

EXAMPLE 2.—REACTION OF 4,4-BIS(4-HYDROXYPHENYL)PENTANOIC ACID WITH STYRENE OXIDE

Styrene oxide (0.9 mole) is added to a reaction mixture containing 2.1 mole of 4,4-bis(4-hydroxyphenyl) pentanoic acid and 0.3 gm. of sodium hydroxide in dioxane in a one-liter 3-necked flask equipped similar to that used in Example 1. The reaction mixture is maintained at about 110° to about 147° C. for about seven hours. The resulting product has an acid value of zero, indicating that the carboxyl group has reacted with at least one equivalent of styrene oxide. The molecular weight of the product is about 1366, indicating that about 0.9 mole of oxide has reacted with about 0.1 mole of acid.

It is further understood that other aralkylene oxides of Formula IV in addition to styrene oxide can be used in the foregoing reaction. That is, oxides such as 3-phenylpropylene oxide and 4-totylbutylene oxide can be used to obtain the corresponding organo-oxylated compounds.

EXAMPLE 3.—REACTION OF 4,4-BIS(4-HYDROXYPHENYL)PENTANOIC ACID WITH PROPYLENE OXIDE

This reaction is carried out in accordance with the procedure described in Example 1 to produce products in which the number of moles of propylene oxide per mole of acid varies from about 9 to about 55.

By utilizing the products of Examples 1, 2 and 3, other products within the scope of the general Formula I are similarly prepared.

The products of this invention vary somewhat in their physical properties. They are generally high-boiling liquids or low-melting solids. When styrene oxide is the organo oxide employed, the resulting products generally are light, amber colored solids with low softening points. The reaction product of one mole of 4,4-bis(4-hydroxyphenyl)pentanoic acid and about 9 moles of propylene oxide is a viscous liquid. The reaction product of ethylene oxide with 4,4-bis(4-hydroxyphenyl)pentanoic acid containing less than 15 moles of ethylene oxide per mole of hydroxy acid, is either completely insoluble in water or forms milky dispersions. In contrast, those reaction products containing at least 15 moles of ethylene oxide per mole of hydroxy acid are readily soluble in water, and vary from high-boiling liquids to low-melting waxy solids.

Certain organo-oxide derivatives of ortho-cresol/levulinic acid reaction products are water soluble when the number of moles of ethylene oxide per mole of ortho-cresol/levulinic acid is 12. Propylene oxide derivatives of phenol/levulinic acid reaction products are water insoluble regardless of chain length. The same is true with the styrene oxide derivatives.

EXAMPLE 4.—REACTION OF 4,4-BIS(4-HYDROXY-5-METHYLPHENYL)PENTANOIC ACID WITH ETHYLENE OXIDE

This reaction is carried out in accordance with the procedure described in Example 1. Ethylene oxide (16 moles) is added to a reaction mixture containing 0.5 mole of 4,4-bis(4-hydroxy-5-methyl)pentanoic acid and 1.6 gms. of sodium hydroxide. This ethylene oxide derivative of 4,4-bis(4-hydroxy-5-metrylphenyl)pentanoic acid is an amber liquid completely miscible with water. When 28 moles of ethylene oxide are employed in the above reaction, a waxy, tan solid which is soluble in water is produced.

It is further understood that other substituted phenol/carbonyl-carboxylic acid reaction products can be combined with various organo oxides according to the present invention to produce the herein-claimed novel compounds. For example, the various di(hydroxyaromatic) alkylidene carboxylic acids obtained by reacting certain substituted phenols of Formula II such as cresol, xylenol, 2-tertiary butyl-phenol, and 2-isopropyl phenol with certain keto-carboxylic acids of Formula III; can be reacted with the organo oxides of Formula IV to produce compounds within the scope of the present invention.

EXAMPLE 5.—REACTION OF 4,4-BIS(4-HYDROXYPHENYL)-N-OCTADECYL PENTAMIDE WITH ETHYLENE OXIDE

This reaction is conducted in accordance with the procedure described in Example 1. Ethylene oxide (3 moles) is added to a reaction mixture containing 0.21 mole of 4,4-bis(4-hydroxyphenyl)-N-octadecyl pentamide and 1.1 gms. of sodium hydroxide. The ethoxylated derivative is an amber liquid completely miscible with water.

The pentamide reactant is obtained by fusing 0.25 mole of 4,4-bis(4-hydroxyphenyl)pentanoic acid with 0.25 mole of N-octadecyl amine in the presence of 0.25 mole of KOH at a temperature of from about 200 to about 210° C. for about eight hours. Mono-alkylamines other than N-octadecylamine can be employed in the above described process. For example, amines having the General Formula $NH_2R_3$ can be used where $R_3$ is as defined in Formula I above. Ammonia, ethylamine and octylamine have been reacted with 4,4-bis(4-hydroxyphenyl)pentanoic acid to obtain the corresponding amides.

It is further understood that the various organo oxides of Formula IV and the various di(hydroxyaromatic) alkylidene amides of Formula I can be combined according to the procedure of Example 5 to obtain the corresponding organo-oxylated amides.

As aforesaid, certain of the compounds of this invention are surface active agents and, accordingly, are useful as detergents, emulsifiers, wetting agents, and in other applications where surface activity is important. In these applications, they are used in substantially the same manner and substantially the same concentrations as other surfactants.

A particularly valuable property manifested by certain compounds of this invention is the fact that they are low-foaming materials. This is especially important in detergent applications, for example, in washing machines or dish washers where large quantities of foam or suds may tend to decrease the efficiency of the machine.

Propylene oxide derivatives of 4,4-bis(4-hydroxyphenyl)pentanoic acid are useful in the formation of water-in-oil emulsions. For example, equal volumes of water and toluene containing 2% by weight of a product which includes at least 9 moles of propylene oxide per mole of acid forms an emulsion which is stable for two to three hours. Comparable ethoxylated derivatives of the acid are useful in the formation of oil-in-water emulsions. For example, a mixture containing equal volumes of water and toluene in which the toluene contains 2% by weight of the emulsifier, will form an oil-in-water emulsion which is stable up to about 8½ hours.

Growth regulants

Certain compounds of this invention have been found to affect the growth rate of plants. That is, certain of the compounds of Formula I have been found to enhance the growth rate of plants whereas other compounds of Formula I exhibit toxic properties towards plants and accordingly, retard the growth rate thereof. Accordingly, these growth regulant compounds are particularly useful in various agricultural compositions.

Growth rate enhancing compositions

It has been found that the most effective growth enhancing compounds of the invention are those containing polyethoxylated alkyls, wherein the oxyethylene chain constitutes at least 50% of the weight of the compound and the aromatic substituents are free from alkyl substituents. The most important growth rate enhancing compounds are the polyethoxylated derivatives of 4,4-bis(4-hydroxylphenyl)pentanoic acid in which the sum of $y_1$, $y_2$ and $y_3$, as these are defined in general Formula I above, is from about 15 to about 30, i.e. the ethoxylate content is from about 70% to about 82% by weight of the total compound. Other compounds within the scope of general Formula I also exhibit useful growth enhancing activity, but the ethoxylated derivatives of 4,4-bis(4-hydroxyphenyl)pentanoic acid are preferred because of their outstanding enhancing activity and because they are readily prepared from a commercially available acid. It has been found that when plants are contacted with compositions containing these active compounds, the growth rate of the plant is very substantially increased.

The preferred growth rate enhancing compounds of the invention can be represented by the following formula:

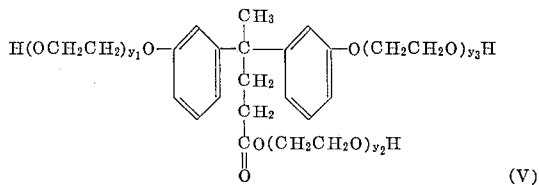

(V)

wherein $y_1$, $y_2$, and $y_3$ are as defined in Formula I with the proviso that their sum is from about 15 to about 30. The above formula shall be referred to hereinafter as Formula V.

The plants to be treated are contacted with an effective amount of one or more of the growth enhancing compounds of Formula V in admixture with an acceptable carrier or extending agent. An extending agent is selected which will have no adverse effect upon the plant in accordance with standard agricultural practice. A preferred carrier is water. Desirably the growth enhancing ingredient(s) is taken up in water and the resulting aqueous composition sprayed on the plants. Alternatively, these ingredients may be dispersed and applied to the plant in other extending agents either liquid, semi-solid or solid.

The terms "carrier" and "extending agent" as used herein include any and all of those agriculturally acceptable extending agents in which the compounds of the instant invention are dispersed, for example the solvent of a true solution, the liquid phase of suspensions, emulsions or aerosols, the semi-solid carriers of ointments and the solid phase of dusts, powders and granules.

The term "dispersed" is used herein in its widest possible sense. When it is said that the active agents of this invention are dispersed it means that the particles may be molecular in size and held in true solution in a suitable solvent. It means also that the particle may be colloidal in size and dispersed in and throughout a liquid phase in the form of a suspension or an emulsion. It also includes particles which are dispersed in a semi-solid viscous carrier such as lanolin or petrolatum in which they may be actually dissolved or merely suspended. The term "dispersed" also includes particles which are mixed with and spread throughout a solid carrier so that the mixture is in the form of powder, dust or granules. It also includes mixtures which are suitable for use in aerosols in which the active ingredients are dissolved or suspended in a suitable extending agent and packed in a pressurized container for dispelling by the pressure of a compressed gas such as nitrogen or a liquefiable hydrocarbon such as propane or halogenated hydrocarbon such as a Freon. Such aerosol compositions are especially useful to the home or amateur gardener.

There are a number of liquid extending agents other than water which can be utilized to prepare the compositions of this invention. High boiling oils of vegetable origin such as castor oil or olive oil are suitable. Low boiling more volatile liquids such as acetone, cyclohexanone, carbon tetrachloride, ethylene dichloride, solvent naphtha, kerosene and mixtures thereof are also suitable.

The compositions may employ organic or inorganic extending agents. Solid compositions may be prepared using for example calcium carbonate, kaolin, bole, kieselguhr, talc, calcined magnesia and mixtures thereof. Materials of vegetable origin such as ground cork, wood, walnut shells, corncobs, sugar bagasse, pine bark, peanut hulls and cocoa hulls are also useful.

It has been found that the growth enhancing compositions of Formula V, in which the active compounds are dispersed in extending agents at concentrations of about 0.01% by weight or even lower, are particularly effective in increasing the growth rate of plants. However, the concentration is not critical since compositions containing extremely low concentrations will give useful results.

These compositions when applied to plants will generally contain at least about 0.01% by weight of the active ingredient although as aforesaid, less concentrated solutions even as low as about 0.001% by weight will produce beneficial results and this latter may be considered a practical minimum. The compositions may be provided at these concentrations or at higher concentrations for example about 1% by weight. Alternatively, highly concentrated compositions ready for dilution at the point of use may be prepared. Generally it is preferred to employ these active ingredients in concentrations no greater than about 1% by weight. For example, when certain of the compounds of Formula V are uesd at concentrations of 10% by weight or greater, toxic effects are produced on certain treated plants.

The preferred dosage requirement varies with the structure of the active ingredient, plant species, effect to be achieved and the time of application. When application is by spraying, the liquid will preferably contain from about 0.01% to about 0.1% by weight of at least one active compound of Formula V and the plant is sprayed to drop off. At concentrations less than about 0.01% by weight, it may not be possible to achieve the optimum dosage by spraying to drop off and at concentrations above about 1% by weight, the optimum dosage may be unnecessarily exceeded. The same concentration ranges are generally preferred for solid and semi-solid compositions such as dusts, granules and ointments. However, to achieve the same result with the same plants under the same conditions, more concentrated semi-solid or solid dispersions having a higher concentration of active ingredients is required than with liquids.

A particular advantage of ointments is that exact quantities of the growth enhancing agent of Formula V can be applied to each plant on an individual basis by spreading a measured quantity of ointment of known concentration on each plant. A similar advantage pertains to dust although some activity may be lost by the composition dropping to the ground.

The growth enhancing compositions of the present invention do not necessarily produce larger plants. They increase the growth rate of the plants. This is a most important agricultural consideration which suggests many economic advantages. By their use, entirely new crops may be grown in areas where heretofore a short growing season has prevented their maturation. In those areas where the growing season is relatively longer, two complete crops per growing season are possible. In greenhouse operations, the overall annual produce can be markedly increased. The growth term for fodder crops can be decreased and the land turned to direct market crops.

The remarkable and unexpected results which can be achieved by the use of the growth enhancing compounds of Formula V are illustrated by the mung bean rooting test. This standard test is widely employed to ascertain the effectiveness of plant growth regulants. It has been found that regulants which induce a favorable response with mung beans similarly induce favorable responses with other commercially available plants.

EXAMPLE 6.—GROWTH RATE ENHANCING PROPERTIES OF COMPOSITIONS CONTAINING CERTAIN POLYALKOXYLATED 4,4 - BIS(4 - HYDROXYPHENYL) PENTANOIC ACID COMPOUNDS

These tests were designed to be statistically significant and were carried out as follows:

Mung bean (*Phaseolus aureus*) cuttings consisting of 7 cm. sections of etiolated decapitated hypocotyl were placed in test tubes containing solutions of test materials. After six days, roots were counted and totaled for each treatment. Differences in root numbers indicated effective treatments as compared to other controls.

*Plant materials.*—Mung bean seeds were soaked in running water for 24 hours. Seeds were then planted in flats of vermiculite and placed in an incubator at a constant temperature of about 26° C. in complete darkness. After 96 hours in incubation, etiolated seedlings were decapitated below the cotyledonary node. The remaining etiolated hypocotyl stem and root system were returned to the incubator for about 24 hours. After final incubation, the cuttings were taken consisting of 7 cm. sections of etiolated hypocotyl.

*Procedure.*—Cuttings 7 cm. long of similar cross-section dimensions were selected. These cuttings were placed in 15 x 115 mm. test tubes containing 5 ml. of test solution. Test solutions were prepared by diluting test materials with sterile deionized water. A minimum of ten replicates were used per test. Subsequently, the test tubes were placed in racks and placed under continuous illumination from 40 watt cool white fluorescent lights. A mean temperature of about 27° C. was maintained. After six days under these conditions, the hypocotyl sections were examined for rooting and the roots counted.

*Evaluation of treatment.*—The number of roots on each cutting was counted and the replicates totaled and averaged. These totals and averages were compared with those of untreated control sections which were identically treated except for the absence of the active agent.

In these tests and at a concentration of about 0.01% by weight in water a polyethoxylated 4,4-bis(4-hydroxyphenyl)pentanoic acid of Formula V in which the ethoxylate content was 75% by weight of the total compound, gives responses in which the growth rate of the test plants is as much as 90% higher than the control. A similar composition in which the ethoxylate content of the acid derivatives was 82% by weight of the total compound gives a growth rate response 124% higher than the control. At a concentration of 0.1% the growth rate induced by the 82% compound is 48% higher than the control.

Similar results are obtained with these and other growth rate regulants within the scope of this invention in a wide variety of agricultural tests including flower assays, callus assays, vegetative growth tests and elongation tests.

Growth retardant compositions

As noted above, certain of the compositions within the scope of the invention have a toxic effect on certain plants and accordingly inhibit the normal growth rate of these plants. It has been found that when certain plants are contacted with agricultural compositions such as those used with the growth enhancing compositions described above, wherein at least one of the herein-defined retardants is substituted for the growth enhancing compound, in an effective concentration, the growth rate of the plant is substantially decreased.

The extending agents described above and the method of incorporating the growth regulant therein can also be used for the growth retardant compositions of the invention. These growth retardant compositions have obvious utility in the control of undesirable plant life.

The results in growth rate regulation which can be achieved by the use of the growth retardants of this invention are illustrated by the mung bean rooting test which is described in Example 6 above. Generally, it has been found that growth regulants which induce a toxic response with mung beans similarly induce retardant and toxic responses with other commercially available plants. The relative retardant effectiveness depends in part on the particular compound and concentration thereof employed. That is, with reference to Formula I above, the degree of organo-oxylation (the value $y_1$, $y_2$, and $y_3$), the particular alkyl substituents ($R_1$) and also the particular type of A employed all influence the degree of toxicity of the compound. For example, when the sum of $y_1$, $y_2$, and $y_3$ is greater than 30 and/or, $R_1$ is a tertiary alkyl and/or A is

the resulting compound will generally produce a particularly toxic effect as determined by the mung bean test.

The growth rate retarding compounds of the instant invention can be represented by the following structural formula:

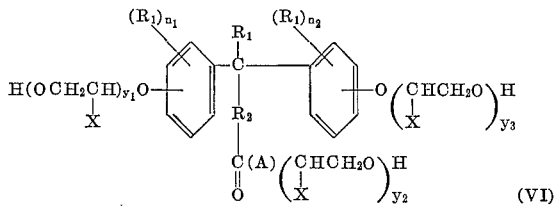

wherein $R_1$, $n_1$, $n_2$, X, $y_1$, $y_2$, $y_3$, and $R_2$ are as defined in Formula I above with the proviso that the sum of $y_1$, $y_2$, and $y_3$ be greater than 30. In a preferred embodiment of the invention, at least $(R_1)_{n_1}$ or $(R_1)_{n_2}$ is an alkyl radical.

EXAMPLE 7.—GROWTH RATE RETARDING PROPERTIES OF CERTAIN COMPOUNDS 4,4-bis(4-hydroxy-5-methylphenyl)pentanoic acid was alkoxylated with ethylene oxide to the extent that the ethylene oxide constituted 86.7% by weight of the total compound. Mung bean tests were conducted similar to those described in Example 6 above. At concentrations of about 0.01% by weight and about 0.1% by weight, the 86.7% polyethoxylated 4,4-bis(4-hydroxy-5-methylphenyl)pentanoic acid produced responses in which the growth rate of the test plants was 25 and 50% retarded respectively in comparison to the control.

In a similar test employing a 0.1% by weight solution of a polyalkoxylated 4,4-bis(4-hydroxyphenyl)-N-octadecyl pentamide containing 81.6% by weight ethylene oxide; a response in which the growth rate of the test plants was 65% retarded as compared to the control was observed.

It has been observed that certain growth retarding compositions of Formula VI produce neutral or only slightly retarding effects when used at concentrations of a few parts per million. However, when employed in higher concentrations, i.e. from about 0.01% to greater than about 1.0% by weight, these compounds exhibit significant toxic properties.

It will be understood by those skilled in the art that various modifications may be made without departing from the spirit and scope of this invention and it is intended to cover all such modifications in the appended claims.

What is claimed is:

1. A compound selected from the group consisting of those having the formula:

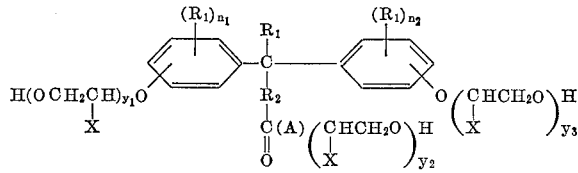

wherein: $R_1$ is selected from the group consisting of a hydrogen atom and a lower alkyl radical containing up to five carbon atoms, $n_1$ and $n_2$ are each whole numbers from 1 to 2, X is selected from the class consisting of a hydrogen atom, lower alkyl radicals containing up to three carbon atoms, aryl radicals, and alkaryl radicals containing up to nine carbon atoms, $y_1$, $y_2$, and $y_3$ are each integers with a value of at least one, the sum of the integers being from about three to about 55, $R_2$ is an alkylene radical containing at least two carbon atoms and A represents a radical selected from the group consisting of —O— and

wherein $R_3$ is selected from the group consisting of a hydrogen atom and an alkyl radical containing up to 18 carbon atoms.

2. A composition of matter comprising the ethylene oxide adduct of 4,4-bis(4-hydroxy-5-methylphenyl)pentanoic acid, wherein the ethylene oxide comprises at least 75% by weight of the compound.

3. A composition of matter according to claim 2 wherein the ethylene oxide comprises about 82% by weight of the compound.

4. A composition of matter comprising the styrene oxide adduct of 4,4-bis(4-hydroxyphenyl)pentanoic acid, wherein the styrene oxide comprises at least 75% by weight of the compound.

5. A composition of matter comprising the propylene oxide adduct of 4,4-bis(4-hydroxyphenyl)pentanoic acid, wherein the propylene oxide comprises at least 75% by weight of the compound.

References Cited by the Examiner
UNITED STATES PATENTS

| | | | |
|---|---|---|---|
| 2,863,754 | 12/1958 | Wain | 71—2.6 |
| 2,923,634 | 2/1960 | Lindemann | 71—2.6 |
| 3,167,583 | 1/1965 | Goldberg et al. | 260—473 |
| 3,207,779 | 9/1965 | Culter et al. | 260—473 |

LORRAINE A. WEINBERGER, *Primary Examiner.*

JAMES O. THOMAS, Jr., *Examiner.*

S. WILLIAMS, *Assistant Examiner.*